United States Patent
Kocak et al.

(10) Patent No.: US 12,252,354 B2
(45) Date of Patent: Mar. 18, 2025

(54) METHOD FOR REMOVING PIECE GOODS FROM A CONVEYOR, BLOWOFF DEVICE AND SORTING SYSTEM

(71) Applicant: Deutsche Post AG, Bonn (DE)

(72) Inventors: Nureddin Kerim Kocak, Karben (DE); Fatih Bayraktar, Erlensee (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 18/076,732

(22) Filed: Dec. 7, 2022

(65) Prior Publication Data
US 2023/0174320 A1    Jun. 8, 2023

(30) Foreign Application Priority Data
Dec. 7, 2021    (DE) ..................... 10 2021 132 204.9

(51) Int. Cl.
*B65G 47/51*    (2006.01)
*B65G 47/50*    (2006.01)

(52) U.S. Cl.
CPC ....... *B65G 47/5104* (2013.01); *B65G 47/503* (2013.01)

(58) Field of Classification Search
USPC .................................................. 198/370.11
See application file for complete search history.

(56) References Cited

U.S. PATENT DOCUMENTS

| | | | |
|---|---|---|---|
| 10,668,506 B2 * | 6/2020 | Erden | B65G 47/96 |
| 11,802,008 B2 * | 10/2023 | Christen | B65G 47/525 |
| 2019/0321860 A1 | 10/2019 | Erden et al. | |

FOREIGN PATENT DOCUMENTS

| | | |
|---|---|---|
| DE | 102018213680 A1 | 2/2020 |
| DE | 10 2018 009 974 | 4/2020 |
| EP | 3566982 A1 | 11/2019 |

OTHER PUBLICATIONS

German Office Action (w/ English translation) for corresponding DE Application No. 10 2021132 204.9, mailed on Aug. 30, 2022, 18 pages.
European Search Report for corresponding Application No. EP 22211314.4, dated Apr. 4, 2023, 6 pages.

* cited by examiner

*Primary Examiner* — William R Harp
(74) *Attorney, Agent, or Firm* — Dority & Manning, P.A.

(57) ABSTRACT

A method for removing a piece good from a conveying means of a sorting system, includes the steps generating image data by means of a camera arranged on a conveyor line; by means of a controller, detecting a piece good not placed completely in the cell area on the conveying means on the basis of the image data generated; generating a blowoff command for a blowoff device arranged on the conveyor line, wherein the blowoff command is generated while considering a time of the generation of the image data, a conveying speed of the conveying means, and an arrangement of the camera, the conveyor line and the blowoff device relative to one another; and by means of the blowoff device, blowing off the piece good not placed completely in the cell area on the conveying means on the basis of the blowoff command.

12 Claims, 1 Drawing Sheet

METHOD FOR REMOVING PIECE GOODS FROM A CONVEYOR, BLOWOFF DEVICE AND SORTING SYSTEM

The present application is based upon and claims the right of priority to German Patent Application No. 10 2021 132 204.9, filed Dec. 7, 2021, the disclosure of which is hereby incorporated by reference herein in its entirety for all purposes.

TECHNICAL FIELD

The invention relates to a method for removing a piece good from a conveying means of a sorting system, wherein the sorting system comprises the conveying means for conveying the piece good in a transport direction along a conveyor line, and wherein the conveying means is configured in such a way that a piece good arranged in a cell area on the conveying means is movable at right angles to the transport direction.

In addition, the invention relates to a blowoff unit for removing a piece good from a conveying means of a sorting system.

Furthermore, the invention relates to a sorting system for sorting piece goods comprising a conveying means for conveying the piece good in a transport direction along a conveyor line and the above blowoff unit.

BACKGROUND OF THE INVENTION

Sorting systems which sort piece goods on the basis of the delivery destination of the piece good to various endpoints by means of a conveying means are known in the prior art. For example, the endpoints are arranged along a conveyor line of the conveying means, and the conveying means is configured in such a way that a piece good arranged in a cell area on the conveying means is movable at right angles to the transport direction of the conveying means. Accordingly, when the appropriate endpoint is reached, the piece good can be conveyed into the appropriate endpoint at right angles to the transport direction.

For example, in sorting centers, transverse belt sorters are used, which comprise a plurality of short belt conveyors fitted at right angles to the transport direction of the sorter. The belt conveyors which define the respective cell areas can be mounted singly or in multiples on trolleys of the conveyor. By moving the transverse belt, the piece goods can be picked up or discharged by the conveying means when being put in and/or discharged.

One problem with such conveying means is that piece goods which are not arranged in the cell area on the conveying means cannot be conveyed to the appropriate endpoint either. For example, small, lightweight and/or misshapen piece goods can be displaced when being put in, or the piece goods roll and/or tilt during the transport on the conveying means. In this way, it is possible for the piece goods not to be arranged completely or no longer completely in the cell area of the conveying means. Piece goods which are not arranged completely in the cell area on the conveying means and accordingly cannot be conveyed to an endpoint by the conveying means either and cannot be removed from the conveying means in such a way have a high risk of being lost, delay the dispatch and reduce the capacity of the conveying means. In particular, piece goods which are arranged between two cell areas not only block one cell area but also the adjacent cell area as a result of their position. For example, piece goods which are arranged on a covering between two transverse belts block both transverse belts. This problem leads to a drastic reduction in the capacity of the conveying means. In addition, the misplaced piece goods must be removed manually by employees when the conveying means is at a standstill, which is not only complicated but, as a result of the standstill of the conveying means, leads to further delays, capacity restrictions and additional costs.

DESCRIPTION OF THE INVENTION

Starting from this situation, it is an object of the present invention to provide measures which reduce the capacity losses brought about by misplaced piece goods. In particular, it is an object of the invention to provide measures which can remove misplaced piece goods from the conveying means even when the conveying means is running.

The object of the invention is achieved by the features of the independent claims. Advantageous refinements are specified in the sub-claims.

Accordingly, the object is achieved by a method for removing a piece good from a conveying means of a sorting system, wherein the sorting system comprises the conveying means for conveying the piece good in a transport direction along a conveyor line configured as a circular line, and wherein the conveying means is configured in such a way that a piece good arranged in a cell area on the conveying means is movable at right angles to the transport direction, comprising the steps generating image data by means of a camera arranged on the conveyor line, wherein the image data represent at least the conveying means in one section of the conveyor line, by means of a controller, detecting a piece good not placed completely in the cell area on the conveying means on the basis of the image data generated, by means of the controller, classifying the piece good not placed completely in the cell area on the conveying means with regard to a property of the piece good, in particular a shape, a position, a dimension, a packaging material, a surface finish and/or a weight, on the basis of the image data generated, generating a blowoff command for a blowoff device arranged on the conveyor line, by means of the blowoff device, blowing off the piece good not placed completely in the cell area on the conveying means on the basis of the blowoff command, checking the blowoff by means of a light barrier after the blowoff, and receiving a check signal generated by the light barrier, wherein the blowoff command is generated by means of machine learning while considering a time of the generation of the image data, a conveying speed of the conveying means, an arrangement of the camera, of the conveyor line and the blowoff device relative to one another and while considering the check signal and the classification of the piece good.

Furthermore, the object is achieved by a blowoff unit for removing a piece good from a conveying means of a sorting system, wherein the blowoff unit comprises a camera, a controller and a blowoff device, and wherein the blowoff unit is set up to carry out the above method.

In addition, the object is achieved by a sorting system for sorting piece goods, comprising a conveying means for conveying the piece good in a transport direction along a conveyor line and the above blowoff unit, wherein the conveying means is configured in such a way that a piece good arranged in a cell area on the conveying means is movable at right angles to the transport direction.

One aspect of the invention is that to remove the misplaced piece goods—which means those piece goods which are not arranged completely in the cell area on the conveying means—the blowoff device is used. The blowoff device removes the misplaced piece good without contact by blowing off, so that the conveying means does not have to stop to remove the piece good. Accordingly, misplaced piece goods can be removed while the conveying means is running. In addition, the noncontact removal of piece goods also has the advantage that no safety precautions such as for example fencing or employee training are needed for the operation. In addition, the noncontact removal by means of compressed air can be carried out even at high conveyor speeds of the conveying means, without it having to be feared that the piece goods are damaged, as would be the case in mechanical removal of the piece goods.

In addition, the method, the blowoff unit and/or the sorting system permits automated removal of the misplaced piece goods. As a result of the detection of the misplaced piece goods on the basis of the image data, the generation of the blowoff command for the blowoff device and the blowing off of the piece goods on the basis of the blowoff command, potential endangerment of employees as a result of the detection and/or removal of misplaced piece goods is thus ruled out from the beginning. This increases the working safety and reduces the costs.

A further aspect of the invention is that misplaced piece goods are detected on the basis of the image data generated by the camera and/or that a camera is used to monitor a section of the conveyor line. This leads to a very high detection rate of misplaced piece goods and/or for it to be possible to distinguish misplaced piece goods very well from non-misplaced piece goods. Accordingly, it is made possible that, by blowing off the conveying means, only those piece goods are also removed, which block one or more cell areas by their position and/or which cannot be transported into their appropriate endpoints by the conveying means. The accurate detection of misplaced piece goods therefore leads to unnecessary blowoffs being reduced, which reduces noise pollution by the blowoff and in addition reduces capacity losses as a result of unnecessary removal.

Moreover, since image data not only allow conclusions to be drawn as to whether a piece good is arranged completely in the cell area or not, but also allow conclusions to be drawn concerning a shape of the piece good, a position of the piece good, a dimension of the piece good, a packaging material of the piece good, a surface finish of the piece good, a weight of the piece good and/or further properties of the piece good, the blowoff command can be generated in a targeted manner and individually for the piece good. In this way, a precise blowoff is thus permitted which on the one hand leads to a high blowoff rate, i.e. has the effect that the removal from the conveying means by blowoff is successful for the greatest number of piece goods detected as misplaced piece goods, and on the other hand also makes it possible to reduce noise pollution caused by imprecise and/or unnecessary blowoff. In other words, the camera or the generation of the image data results in the blowoff procedure being able to be carried out in a particularly precise manner.

In addition, the image data also permit a statistical evaluation as to which properties of piece goods particularly often lead to misplacing and/or which cell areas of the conveying means are how often loaded with misplaced piece goods. Accordingly, capacity losses on the sorting system can be reduced. In particular, the image data, in combination with the check signal, make it possible for the controller to automatically detect patterns and/or regularities in the image data which have a relationship with a successful or unsuccessful blowoff. In this way, the blowoff command can be adapted automatically by means of machine learning.

A further aspect of the invention is that the conveyor line is configured as a circular line, in which the piece goods are guided in the circuit. This makes it possible for a blowoff that is not successful leading to the blowoff command being adapted during the next blowoff. For example, during the next passage of the previously not successfully blown off piece good, a blowing period and/or a blowing time can be adapted. The controller preferably receives the check signal.

In a first step of the method, the image data are generated by means of the camera arranged on the conveyor line. The camera is therefore configured and preferably arranged on the conveyor line in such a way that image data which at least represent the conveying means in a specific section of the conveyor line are generated. The image data are preferably a chronological sequence of individual still images. The still images can be generated, for example, with a predefined and/or invariable image repetition rate. Alternatively, the still images can also be generated with a variable image repetition rate, for example on the basis of a trigger and/or matched to a current conveying speed of the conveying means. The image repetition rate of the image data is preferably matched to the conveying speed of the conveying means in such a way that at least the piece goods transported by the conveying means are each represented by at least one still image of the image data. More preferably, each still image represents at least the conveying means in the section of the conveyor line. In other words, in addition to the conveying means, still further component parts of the sorting system can therefore also be represented by the image data. In addition, the camera is preferably arranged in such a way that the section of the conveyor line that is depicted on the image data is preferably of such a size that at least one piece good transported by the conveying means is represented completely by a still image of the image data.

In a further step of the method, a piece good not placed completely in the cell area on the conveying means is detected by means of the controller on the basis of the image data generated. Preferably, therefore, the image data are transmitted to the controller for evaluation. Preferably, the controller detects misplaced piece goods by means of an image detection and/or edge detection algorithm. In other words, therefore, the controller is preferably configured to detect a piece good not placed completely in the cell area on the conveying means on the basis of the image data generated. Preferably, the detection of the piece good not placed completely in the cell area on the conveying means on the basis of the image data generated comprises detection of an intermediate cell area on the basis of the image data generated and a subsequent check by means of the controller as to whether there is a piece good in the intermediate cell area. The intermediate cell area is preferably that area of the conveying means which is located between two adjacent cell areas.

In a further step of the method, a blowoff command is generated. Particularly preferably, the blowoff command is generated in the case in which a piece good not placed completely in the cell area is detected by the controller on the basis of the image data. Furthermore, when generating the blowoff command, the time of the generation of the image data, the conveying speed of the conveying means and an arrangement of the camera, of the conveyor line and of the blowoff device relative to one another is considered.

In relation to the time of the generation of the image data, provision can be made for the image data to be provided with a time stamp.

In relation to the conveying speed of the conveying means, provision can be made for the method to comprise the step of determining the conveying speed of the conveying means on the basis of the image data. For example, the conveying speed can be determined on the basis of the image repetition rate and the image data. Alternatively or additionally, the conveying speed can be provided as a target value or as an actual value.

For example, after detecting a misplaced piece good, the controller can generate a signal, for example a digital signal. This signal can, for example, be generated by the controller in the form of the blowoff command while considering the time of the generation of the image data, the conveying speed of the conveying means, and the arrangement of the camera, of the conveyor line and of the blowoff device relative to one another. Alternatively, while considering the time of the generation of the image data, the conveying speed of the conveying means, and the arrangement of the camera, of the conveyor line and of the blowoff device relative to one another, the signal can be converted by the controller and/or by a further controller into the blowoff command, for example configured as an analog switching signal. In other words, therefore, the controller and/or the further controller is configured to generate the blowoff command for the blowoff device while considering the time of the generation of the image data, the conveying speed of the conveying means, and the arrangement of the camera, of the conveyor line and of the blowoff device relative to one another.

In a further step of the method, the piece good not placed completely in the cell area on the conveying means is blown off by means of the blowoff device on the basis of the blowoff command. Preferably, therefore, the blowoff command is sent to the blowoff device which, in accordance with the blowoff command, carries out the blowoff. Preferably, the blowoff device is configured to remove the piece good not placed completely in the cell area on the conveying means by means of the blow off from the conveying means on the basis of the blowoff command.

The blowoff unit for removing the piece good from the conveying means of the sorting system comprises the camera, the controller and the blowoff device, wherein the blowoff unit is set up to carry out the above-described method. In principle, the blowoff unit can be operated independently of the sorting system. Alternatively, the sorting system can send information to the controller of the blowoff unit, which information is preferably considered by the controller and/or the further controller when generating the blowoff command, as will be explained in more detail further below.

The sorting system comprises the conveying means for conveying the piece good in the transport direction along the conveyor line, wherein the conveying means is configured in such a way that a piece good arranged in the cell area on the conveying means is movable at right angles to the transport direction. The conveying means is preferably configured from transverse belt sorter.

More preferably, the sorting system comprises an input device arranged on the conveyor line for loading the conveying means with the piece goods, and/or a discharge device arranged on the conveyor line comprising a plurality of endpoints for discharging the piece goods at appropriate endpoints.

More preferably, with respect to the sorting system, provision can be made for the sorting system to comprise a load monitoring device arranged on the conveyor line for determining a position of the piece good arranged in the cell area on the conveying means and/or a scanner arranged on the conveyor line for determining the endpoint of the piece good arranged in the cell area on the conveying means. For example, the scanner is arranged after the load monitoring device in the transport direction, wherein the load monitoring device determines the position of the piece good arranged in the cell area on the conveying means, and the scanner detects an address determining the endpoint and/or a code determining the endpoint on the basis of the determined position. The arrangement of the scanner at a very short distance in the transport direction directly after the load monitoring device reduces the probability that the piece good is displaced between the detection of the position in the cell area by means of the load monitoring device and the detection of the address determining the endpoint and/or of the code determining the endpoint since, in this way, the time until the piece good is transported from the load monitor to the scanner is reduced. A displacement of the piece good would make the detection of the address determining the endpoint and/or of the code determining the endpoint by means of the scanner difficult. More preferably, the discharge device is configured to discharge the piece good to the appropriate endpoint on the basis of the endpoint determined by the scanner.

According to a preferred development of the invention, with respect to the arrangement of the camera, the conveyor line and the blowoff device relative to one another, provision is made for the blowoff device to be arranged after the camera in the transport direction in such a way that between the section of the conveyor line that is represented by the image data and a blowoff location of the conveyor line there is a transport time through the conveying means of 0.2 seconds to 3 seconds, wherein the blowoff location corresponds to that location of the conveyor line at which the blowoff device blows off the piece good not placed completely in the cell area on the conveying means. Particularly preferably, the arrangement is such that the transport time is 1 second±30%. More preferably, provision is made for the arrangement of the camera, the conveyor line and the blowoff device relative to one another to be such that the above-defined transport time through the conveying means is not shorter than a switching time and/or reaction time of the blowoff unit and in particular of the camera and/or of the blowoff device. The above values for the transport time have proven to be particularly suitable. Too low a transport time makes punctual and thus successful blowing off by the blowoff device difficult. However, too high a transport time between the section of the conveyor line represented by the image data and the blowoff location makes successful blowing off of misplaced piece goods difficult. For example, the probability that the piece good is displaced on the conveying means between the section of the conveyor line in which the piece good is detected by the camera and the blowoff location is increased, the longer the transport time between them is. Accordingly, provision is preferably made for the transport time between the section of the conveyor line represented by the image data and the blowoff location to be no more than 3 seconds. Given a typical conveying speed of the conveying means of 2 m/s, the section detected by the camera and the blowoff location are therefore preferably removed no more than 6 m from one another along the conveyor line.

In relation to the arrangement, according to a further preferred development of the invention, provision is made for the camera to be arranged on the conveyor line in such a way that the image data generated by the camera represent the conveying means from above. In other words, the camera is therefore preferably not arranged at the side of the conveyor line but preferably above the conveyor line, so that the camera detects the section of the conveyor line and the conveying means from above. This makes the detection of misplaced piece goods on the conveying means easier. Furthermore, in this type of arrangement, the determination of the shape of the piece good, the position of the piece good, the dimension of the piece good, the packaging material of the piece good, the surface finish of the piece good, the weight of the piece good and/or of further properties of the piece good made possible by the image data are simplified.

With regard to the arrangement of the blowoff device, according to a further development of the invention provision is made for the blowoff device to be arranged on the conveyor line in such a way that a compressed air blast generated by the blowoff device is directed at right angles to the transport direction of the conveying means and/or is located in a plane parallel to a conveying plane of the conveying means. The blowoff device therefore preferably generates the compressed air blast in a direction which is directed at right angles to the transport direction. In such a way, the piece good can be blown off from the conveying means on the shortest path. Furthermore, the compressed air blast is preferably in the plane parallel to the conveying plane of the conveying means, which likewise permits efficient blowoff of the piece good. Both measures additionally permit the blowoff to be directed accurately onto the piece good since, in such a way, the distance which the compressed air blast must cover from the nozzle to the piece good is small and, corresponding thereto, a contribution is made so that an emission of sound by the blowoff can be kept low.

According to a further preferred development of the invention, provision is preferably made for the blowoff command to comprise at least one blowing time and a blowing period, and for the blowoff step to comprise generating at least one compressed air blast for the blowing period at the blowing time by means of the blowoff device. The controller and/or the further controller therefore preferably generates a blowoff command to the effect that a blowing period of the compressed air blast and a blowing time of the compressed air blast are defined. The blowoff device then carries out the blowoff while considering the blowoff command comprising the blowing period and the blowing time.

The blowoff device preferably comprises one or more compressed air nozzles, preferably equipped with solenoid valves. Preferably, the solenoid valves are supplied with compressed air via a compressed air system, more preferably with an operating pressure of 6 bar±20%. The solenoid valve is preferably opened in accordance with the blowoff command and allows the compressed air to pass through the compressed air nozzle for the blowing period determined by the blowoff command. Preferably, the compressed air nozzle compresses the volume flow of the compressed air.

As already mentioned, the image data permit a targeted blowoff of the piece good. In this connection, according to a preferred development of the invention, provision is made for the method to comprise the step of determining a dimension of the piece good not placed completely in the cell area on the conveying means parallel to the transport direction, and wherein the blowoff command, preferably the blowing period, is generated while considering the determined dimension. The dimension of the piece good parallel to the transport direction preferably means the extent of the piece good parallel to the conveyor line in the case of a piece good placed on the conveying means. This dimension preferably also determines how long the piece good is located in front of the compressed air nozzle of the blowoff device on account of the transport along the transport direction. The blowoff command, and in particular the blowing period, can accordingly be matched to the determined dimension. Preferably, piece goods having a large extent parallel to the transport direction lead to a longer blowoff period. More preferably, the dimension of the piece good not placed completely in the cell area on the conveying means parallel to the transport direction is determined by means of the controller on the basis of the image data generated.

According to a further preferred development of the invention, provision is made for the method to comprise the step of determining a shape, a position, a dimension, a packaging material, a surface finish and/or a weight of the piece good not placed completely in the cell area on the conveying means, and for the blowoff command to be generated while considering the determined shape, the position, the dimension, the packaging material, the surface finish and/or the weight. Particularly preferably, the shape, the position, the dimension, the packaging material, the surface finish and/or the weight of the piece good not placed completely in the cell area on the conveying means are determined by means of the controller on the basis of the image data generated. Alternatively or additionally, provision can be made for the controller and/or the further controller to receive data relating to the shape, the position, the dimension, the packaging material, the surface finish and/or the weight of the piece good from the sorting system. For example, provision can be made for a weight class of the piece good to be read simultaneously by means of the scanner of the sorting system which detects the address determining the endpoint and/or the code of the piece good determining the endpoint. This weight class can be sent to the controller and/or the further controller as the weight of the piece good and considered when generating the blowoff command.

In particular with regard to a precise blowoff, according to a further development of the invention provision is made for the method to comprise the step of receiving a clock signal of the sorting system, and for the image data to be generated while considering the received clock signal and/or for the blowoff command, preferably the blowing time, to be generated while considering the received clock signal. The clock signal is preferably received by the controller and/or further controller. Preferably, therefore, the sorting system generates the clock signal, particularly preferably by means of sorter-system-internal sensors, such as for example light barriers (e.g., a light barrier 55 as shown in FIG. 1). More preferably, the clock signal reflects the actual conveying speed of the conveying means. For example, provision can be made for a logic level of the clock signal to change each time when a specific constituent part of the conveying means is drawn past a sensor of the sorting system. The clock signal is therefore preferably used for the time coordination and/or synchronization between the conveying means and the blowoff unit and in particular for coordination between the conveying means and the camera and/or the blowoff device. In addition, the clock signal can preferably serve as a reference for the controller and/or the further controller when generating the blowoff command. In a corresponding way, more accurate blowoff of misplaced piece goods is possible, which in turn reduces the sound pollution as a result of the blowoff and/or increases the rate of the successful blowoffs. Particularly preferably, the clock signal is considered when generating the image data by means of the camera arranged on the conveyor line. In this way, therefore, the image repetition rate can be matched to the current conveying speed of the conveying means. Preferably, therefore, image data are generated exactly when the conveying means is located in front of the camera, in such a way that the image data generated by means of the camera are suitable to detect piece goods not placed completely in the cell area thereon.

According to a further preferred development, provision is made for the blowoff device to comprise a plurality of compressed air nozzles, wherein the plurality of compressed air nozzles are arranged beside one another in the transport direction, wherein the method comprises the step of determining a shape, a position, a dimension, a packaging material, a surface finish and/or a weight of the piece good not placed completely in the cell area on the conveying means, and wherein the blowoff command is generated for the plurality of compressed air nozzles while considering the determined shape, position, dimension, packaging material, surface finish and/or weight in such a way that the piece good can be removed and/or is removed from the conveying means with the shortest possible total blowing period.

Preferably, the shape, the position, the surface finish and/or the weight of the piece good not placed completely in the cell area on the conveying means is determined by means of the controller on the basis of the image data generated. Alternatively or additionally, provision can be made for the controller to receive data relating to the shape, the position, the surface finish and/or the weight of the piece good from the sorting system. More preferably, the total blowing period is to be understood as that time period for which one or more compressed air nozzles are operated. For example, if a first of two compressed air nozzles is operated with the blowing period a and a second compressed air nozzle is operated with the blowing period b, where b>a, and both compressed air nozzles are operated at the same blowoff time, the total blowing period is b. However, if the compressed air nozzles are operated one after another in time in such a way that there is no time at which both compressed air nozzles are operated simultaneously, the total blowing period is a+b. A reduction in the total blowing period is advantageous in particular with regard to the sound pollution. Accordingly, it is more advantageous to operate a plurality of compressed air nozzles simultaneously than one after another.

According to a further preferred development of the invention, provision is made for the sorting system to comprise a load monitoring device arranged on the conveyor line for determining a position of the piece good arranged in the cell area on the conveying means, and for the method to comprise the step of receiving a load message from the load monitoring device by the controller, wherein the step of generating image data by means of the camera arranged on the conveyor line comprises considering the load message and/or wherein the step of detecting a piece good not placed completely in the cell area on the conveying means on the basis of the image data generated comprises considering the load message. The detection of piece goods not arranged completely in the cell area on the conveying means can be improved to the effect that the controller receives a prior warning the load message by means of the load monitoring device of the sorting system. The prior warning can, for example, lead to an image repetition rate of the camera being reduced in the time periods in which no misplaced piece good is expected, whereby energy and resources can be saved. Alternatively or additionally, the prior warning can lead to computing resources during the step of detecting the piece good not placed completely in the cell area on the conveying means on the basis of the image data generated being used specifically for image data in which a misplaced piece good is expected. In this way, computing resources can be saved and/or the detection of misplaced piece goods can be improved.

Furthermore, with regard to the image data, according to a preferred development of the invention provision is made for the method to comprise the following steps by means of the controller, comparing the piece goods detected by means of the controller as piece goods not placed completely in the cell area on the conveying means with piece goods detected by the controller as piece goods placed completely in the cell area on the conveying means and/or by means of the controller, detecting similarities between those piece goods which have been detected by means of the controller as piece goods not placed completely in the cell area on the conveying means.

In such a way, therefore, it is possible to identify properties of the piece goods which particularly frequently lead to piece goods being misplaced. If, in such a way, it transpires for example that certain properties of the piece goods lead to a high misplacement rate, this information can be used, for example, to the effect that piece goods which have these properties are fed to manual sorting and do not load the sorting system.

In addition, the image data can be evaluated not only with regard to the properties of the piece goods but also with regard to fault-prone and/or defective cell areas. In this connection, according to a further preferred development of the invention, provision is made for the conveyor line to be configured as a circular line and for the method to comprise the step, by means of the controller, identifying cell areas of the conveying means in which a piece good not placed completely in the cell area on the conveying means has been detected by means of the controller, on the basis of the image data.

Fault-prone and/or defective cell areas can therefore be detected by evaluating the image data. Accordingly, capacity losses of the sorting system can be reduced by means of repairing and/or replacing these cell areas.

According to a further preferred development, the method comprises the step blowing off all piece goods placed on the conveying means by means of the blowoff device.

In the event of an impending repair and/or a planned stoppage of the sorting system, in advance of the stoppage of the conveying means, all the piece goods can be removed from the conveying means by means of the blowoff device. In such a way, the previously practised manual collection of the piece goods can be replaced, which saves costs.

As already mentioned, the invention also relates to the blowoff unit for removing the piece good from the conveying means of the sorting system, wherein the blowoff unit comprises the camera, the controller and/or the further controller, and the blowoff device, and wherein the blowoff unit is set up to carry out the above-described method. In principle, the blowoff unit can be operated independently of the sorting system. Alternatively, the sorting system can send data such as, for example, the clock signal, the load message and/or a weight class of the piece good to the blowoff unit and in particular to the controller and/or the further controller of the blowoff unit, wherein the controller and/or further controller preferably also considers these data when generating the blowoff command.

Further technical features and advantages of the blowoff unit and of the sorting system will be revealed to those skilled in the art from the description of the method for removing the piece good and from the description of the sorting system.

BRIEF DESCRIPTION OF THE DRAWINGS

In the following, the invention will be explained in more detail with reference to the appended drawings by using a preferred exemplary embodiment.

In the drawings

DETAILED DESCRIPTION OF THE EXEMPLARY EMBODIMENT

The exemplary embodiment described is only an example which, within the context of the claims, can be modified and/or supplemented in many ways.

Figure 1:
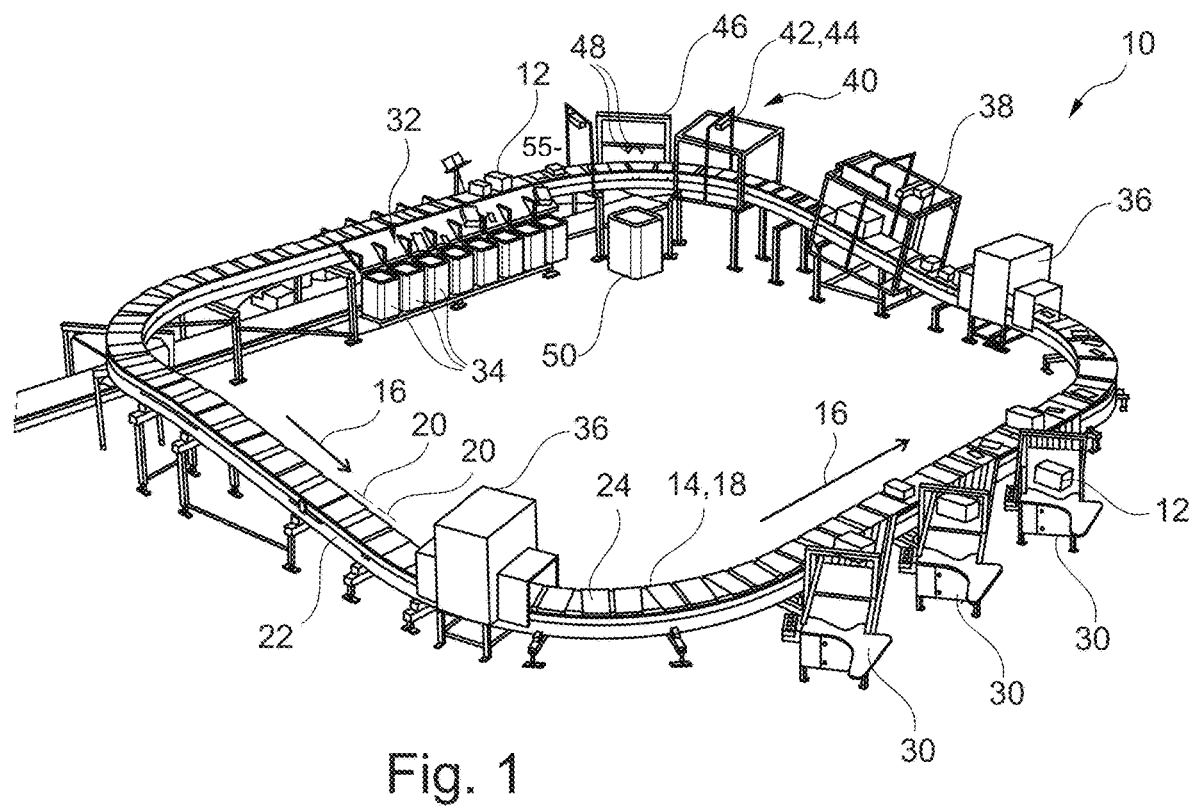
FIG. 1 shows a schematic illustration of a sorting system for sorting piece goods, comprising a conveying means for conveying the piece good and a blowoff unit, according to a preferred exemplary embodiment of the invention.

FIG. 1 shows a schematic illustration of a sorting system 10 for sorting piece goods 12. The sorting system 10 comprises a conveying means 14 for conveying the piece goods 12 in a transport direction 16 along a conveyor line 18. The conveying means 14 is configured in such a way that a piece good 12 arranged in a cell area 20 on the conveying means 14 is movable at right angles to the transport direction 16.

In the present case, the conveying means 14 is configured as a transverse belt sorter 14. The conveying means 14 has a guide system 22, which comprises a plurality of basically freely configurable segments for straights, curves, inclines and declines. In the present case, the segments are combined in such a way that the conveyor line 18 is configured as a circular course. The piece goods 12 are moved from the transverse belt sorter 14 along the transport direction 16 on the guide system 22 by means of a plurality of juxtaposed trolleys 24—also called carriers 24.

Figure 2:
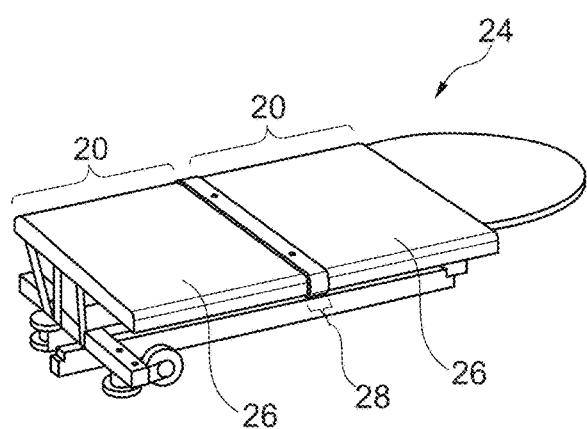
FIG. 2 shows a schematic illustration of a carrier of the sorting system from FIG. 1.

FIG. 2 shows an individual carrier 24 of the sorting system 10 illustrated in FIG. 1. As can be seen from FIG. 2, each carrier 24 in the present case has two transverse belts 26, which can each be loaded with a piece good 12 and define the cell area 20. Piece goods 12 which are not arranged completely in the cell area 20 and, in particular, piece goods 12 which are arranged in the intermediate cell area 28 between two transverse belts 26, can no longer be moved at right angles to the transport direction 16 by the transverse belt 26. This leads to both cell areas 20 adjacent to the intermediate cell area 28 being blocked. In addition, piece goods 12 not placed completely in the cell area 20 on the conveying means 14 i.e. misplaced piece goods 12 can be lost or wrongly sorted.

Furthermore, the sorting system 10, as can be seen in FIG. 1, comprises a plurality of input devices 30 arranged on the conveyor line for loading the conveying means 14 with the piece goods 12, and a discharge device 32 comprising a plurality of endpoints 34 for discharging the piece goods 12 at appropriate endpoints 34. Endpoints 34 are containers 34 which represent a destination district to which a corresponding piece good 12 is to be transported.

After the conveying means 14 is loaded with a piece good 12 by means of the input device 30, a load monitoring device 36 of the sorting system 10 which is arranged on the conveyor line 18 checks whether and in which alignment a piece good 12 is lying on the cell area 20. On the basis of this information, a scanner 38 of the sorting system 10 can detect a sticker of the piece good 12 and determine the endpoint 34 to which the corresponding piece good 12 is to be sorted. As soon as the piece good 12 has reached the height of the corresponding endpoint 34, the transverse belt 26 ejects the piece good 12 into the envisaged endpoint 34.

To remove misplaced piece goods 12 from the conveying means 14, the sorting system 10 shown in FIG. 1 has a blowoff unit 40 comprising a camera 42, a controller 44 and a blowoff device 46.

The blowoff device 46 in the present case comprises a plurality of compressed air nozzles 48 equipped with solenoid valves. The solenoid valves—in the present case the solenoid valve model MN1H-2-314-MS from Festo—are supplied via a compressed air system with compressed air at 6 bar operating pressure. The solenoid valves have a communication connection to the controller 44 and are opened in accordance with a blowoff command of the controller 44 and allow the compressed air to pass through the compressed air nozzles 48 for a blowing period determined by the blowoff command. In the present case, the compressed air nozzles 48 used are the compressed air nozzle models 600.385.35.AL00.0 from Lechler.

The camera 42 represents the sensor system of the blowoff unit 40, wherein the model Checker 4G7 from Cognex is used in the present case. A control cabinet (not shown in the figures) having a main and a control circuit supplies the solenoid valves, the camera 42 and the controller 44 with power and ensures the transmission of the blowoff command to the solenoid valves.

The blowoff unit 40 is configured to carry out the method described below for removing a piece good 12 from the conveying means 14 of the sorting system 10:

In a first step of the method, image data are generated by means of the camera 42 arranged on the conveyor line 18. In the present case the camera 42 is arranged on the conveyor line 18 in such a way that image data which represent at least the conveying means 14 in a section of the conveyor line 18 are generated. In addition, in the present case the camera 42 is placed above the conveying means 14 and detects the conveying means 14 from above.

In a further step of the method, a piece good 12 not placed completely in the cell area 20 on the conveying means 14 is detected by means of the controller 44 on the basis of the image data generated. In the present case, that part of the controller 44 which evaluates the image data is integrated directly in the camera 42. As soon as the intermediate cell area 28 is detected by the controller 44 on the image data, the controller 44 checks whether there is a piece good 12 in the intermediate cell area 28.

In the event that a piece good 12 not placed completely in the cell area 20 on the conveying means 14 has been detected, in a further step of the method, a signal which is sent to a part of the controller 44 that is integrated in the control cabinet (not shown) is generated by the camera-integrated controller 44. On the basis of this signal, the blowoff command configured as a switching signal is generated by the controller 44 while considering the time of the generation of the image data, the conveying speed of the conveying means 14, and the arrangement of the camera 42, the conveyor line 18 and the blowoff device 46 relative to one another.

Finally, in a further step of the method, the piece good 12 not placed completely in the cell area 20 on the conveying means 14 is blown off by means of the blowoff device 46 on the basis of the blowoff command. The blowoff command configured as a switching signal is therefore transferred to the solenoid valve of the blowoff device 46 with a time delay relative to the detection of the misplaced piece good 12, so that blowoff takes place exactly when the piece good 12 is located in front of the compressed air nozzle 48. The solenoid valve switches for the predefined blowing period and allows the compressed air to pass through. By means of the compressed air nozzle 48, the volume flow is directed at the piece good 12 to be blown off, which is handled in a collecting bin 50.

In the present method, a clock signal of the sorting system 10, which is considered when generating the blowoff command, is additionally received by the controller 44. This synchronization leads to a particularly accurately targeted blowoff.

LIST OF DESIGNATIONS

Sorting system 10
Piece good 12
Conveying means, transverse belt sorter 14
Transport direction 16
Conveyor line 18
Cell area 20
Guide system 22
Trolley, carrier 24
Transverse belt 26
Intermediate cell area 28
Input device 30
Discharge device 32
Endpoint, container 34
Load monitoring device 36
Scanner 38
Blowoff unit 40
Camera 42
Controller 44
Blowoff device 46
Compressed air nozzle 48
Collecting bin 50

The invention claimed is:

1. A method for removing a piece good from a conveying means of a sorting system, wherein the sorting system comprises the conveying means for conveying the piece good in a transport direction along a conveyor line configured as a circular line, and wherein the conveying means is configured in such a way that a piece good arranged in a cell area on the conveying means is movable at right angles to the transport direction, comprising the steps:
generating image data by means of a camera arranged on the conveyor line, wherein the image data represent at least the conveying means in one section of the conveyor line at a camera detection area,
by means of a controller, detecting a piece good not placed completely in the cell area on the conveying means on the basis of the image data generated,
by means of the controller, classifying the piece good not placed completely in the cell area on the conveying means with regard to a property of the piece good on the basis of the image data generated,
generating a blowoff command for a blowoff device arranged on the conveyor line at a blowoff location,
by means of the blowoff device, blowing off the piece good not placed completely in the cell area on the conveying means on the basis of the blowoff command,
checking if the blowoff is successful by means of a light barrier after the blowoff, and receiving a check signal generated by the light barrier,
wherein the blowoff command is generated by means of machine learning while considering a time of the generation of the image data which is when the camera detects the piece good on the conveyor line at the camera detection area, a conveying speed of the conveyor line, an arrangement of the camera, the conveyor line and the blowoff device relative to one another and while considering the check signal generated from previous blowoffs and the classification of the piece good,
wherein a time delay is between the time of the generation of the image data and the time the piece good is located at the blowoff location and is determined by the conveying speed of the conveyor line and a distance between the camera detection area and the blowoff location, and wherein the blowoff command is generated so that the blowoff device blows when the piece good is located at the blowoff location.

2. Method according to claim 1, wherein the blowoff device is arranged after the camera in the transport direction, in such a way that between the section of the conveyor line that is represented by the image data and the blowoff location of the conveyor line there is a transport time through the conveying means of 0.2 seconds to 3 seconds, wherein the blowoff location corresponds to that location of the conveyor line at which the blowoff device blows off the piece good not placed completely in the cell area on the conveying means.

3. Method according to claim 1, wherein the camera is arranged on the conveyor line in such a way that the image data generated by the camera represent the conveying means from above.

4. Method according to claim 1, wherein the blowoff device is arranged on the conveyor line in such a way that a compressed air blast generated by the blowoff device is directed at right angles to the transport direction of the conveying means and/or is located in a plane parallel to a conveying plane of the conveying means.

5. Method according to claim 1, wherein the blowoff command comprises at least one blowing time and a blowing period, and wherein the blowoff step comprises generating at least one compressed air blast for the blowing period at the blowing time by means of the blowoff device.

6. Method according to claim 1, wherein the method comprises the step of determining a dimension of the piece good not placed completely in the cell area on the conveying means parallel to the transport direction, and wherein the blowoff command, preferably the blowing period, is generated while considering the determined dimension.

7. Method according to claim 1, wherein the method comprises the step of determining a shape, a position, a dimension, a packaging material, a surface finish and/or a weight of the piece good not placed completely in the cell area on the conveying means, and wherein the blowoff command is generated while considering the determined shape, the position, the dimension, the packaging material, the surface finish and/or the weight.

8. Method according to claim 1, wherein the method comprises the step of receiving a clock signal of the sorting system, and wherein the image data are generated while considering the received clock signal and/or wherein the blowoff command, preferably the blowing time, is generated while considering the received clock signal.

9. Method according to claim 1, wherein the blowoff device comprises a plurality of compressed air nozzles, wherein the plurality of compressed air nozzles are arranged beside one another in the transport direction, wherein the method comprises the step of determining a shape, a position, a dimension, a packaging material, a surface finish and/or a weight of the piece good not placed completely in the cell area on the conveying means, and wherein the blowoff command is generated while considering the determined shape, position, dimension, packaging material, surface finish and/or weight for the plurality of compressed air nozzles in such a way that the piece good can be removed and/or is removed from the conveying means with the shortest possible total blowing period.

10. Method according to claim 1, wherein the sorting system comprises a load monitoring device arranged on the conveyor line for determining a position of the piece good arranged in the cell area on the conveying means, wherein the method comprises the step of receiving a load message from the load monitoring device by the controller, and wherein the step of generating image data by means of the camera arranged on the conveyor line comprises considering the load message and/or wherein the step of detecting a piece good not placed completely in the cell area on the conveying means on the basis of the image data generated comprises considering the load message.

11. Method according to claim 1, wherein the conveyor line is configured as a circular line, and wherein the method comprises the step of, by means of the controller, identifying cell areas of the conveying means in which a piece good not placed completely in the cell area on the conveying means has been detected by means of the controller, on the basis of the image data.

12. Method according to claim 1, wherein a duration of the blowoff command is increased for a first piece good, wherein the duration of the blowoff command is decreased for a second piece good, wherein the first piece good is larger than the second piece good, and wherein a pressure of the blowoff command is increased for the first piece good, and wherein the pressure of the blowoff command is decreased for the second piece good.

* * * * *